Patented Jan. 19, 1937

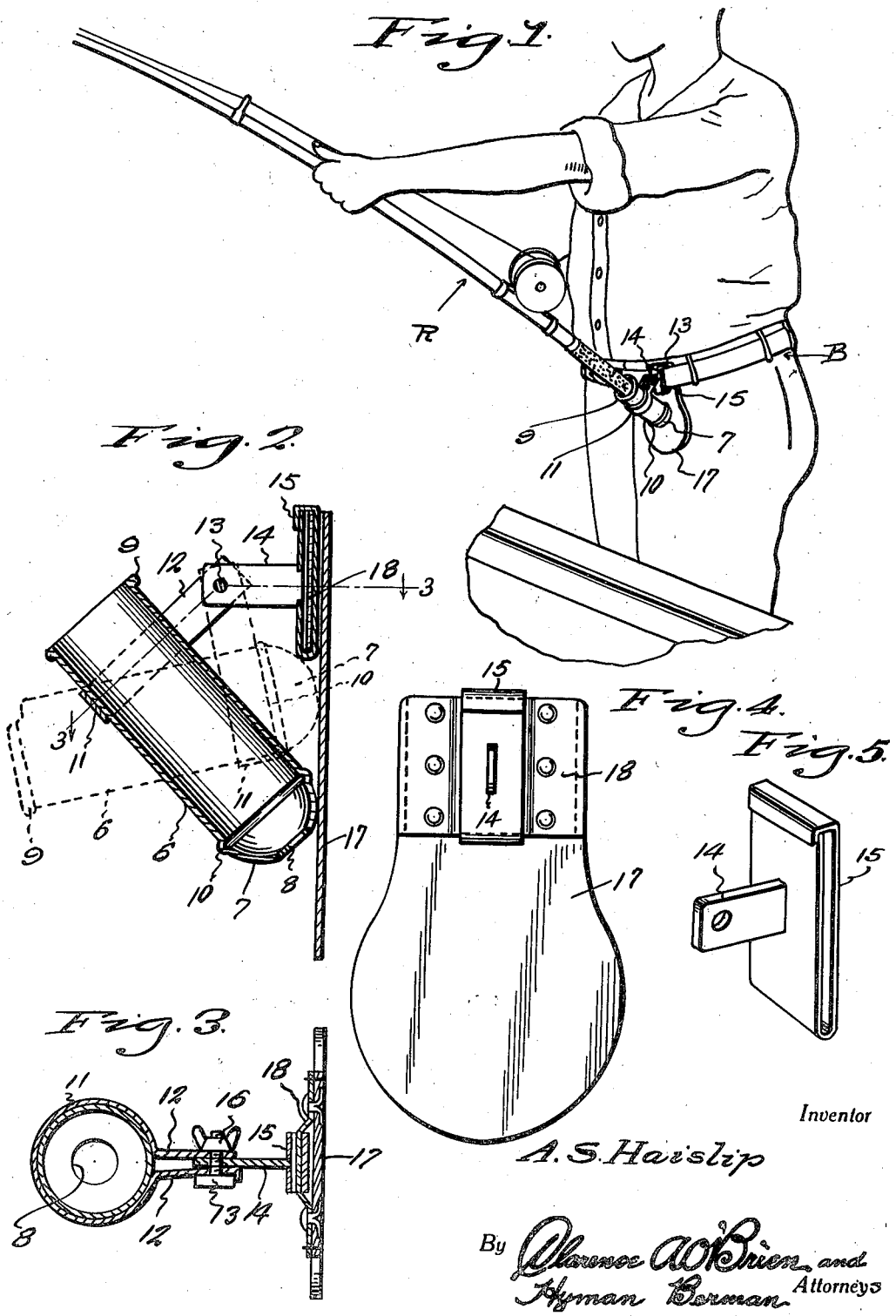

2,068,054

UNITED STATES PATENT OFFICE 2,068,054

BELT-TYPE FISHING ROD HOLDER

Albert S. Haislip, Fredericksburg, Va.

Application March 28, 1936, Serial No. 71,471

5 Claims. (Cl. 224—5)

The present invention relates broadly to fishing pole and rod holders and has reference in particular to an expeditiously usable accessory for personal use by anglers and fishermen, the same being adapted for quick detachable use in association with a conventional trousers-supporting belt and being otherwise adapted to facilitate accommodation and handling of a conventional fishing line, rod, and reel assembly.

Needless to say, I am thoroughly conversant with the general status of the art and trade and familiar with the various accessories and devices of fundamentally similar nature now in use. It is therefore fitting to state, at the outset, that the broad proposition of a rod holder as applied to a waist-encircling belt or the like is not new.

As exemplary of the admittedly old structures to which I refer, it is to be mentioned that, so far as I know, these are characterized by special harnesses, or especially designed belts made for the express purpose of constituting a component and indivisible part of the holder assembly. By way of contrast, the present conception has to do with an attachment, that is, a simple and economical appliance which can be readily connected with the conventional belt and shifted circumferentially to the most comfortable and desirable position for use. This is one feature of the invention.

Additional novelty is predicated upon a novel belt-type pole holder attachment revealing novelty in that it embodies a longitudinally elongated cup-like socket, and attaching means therefor, wherein the socket serves to properly accommodate the handle portion of the pole, allowing it to be inserted and removed freely, permitting it to be turned axially for proper adjustment, and to function continuously to meet the demands existing at the time.

Indicated along other observedly different lines, my unique holder relies for distinctiveness and individuality on the particular attaching fixture including a simple loop to slip over the belt to the desired position and provided with a ring-like clamp embracing the tubular socket in a manner to permit the socket to be slidably adjusted in relation to the clamp and therefore properly tilted in relation to the user to regulate the angularity of the pole to best advantage for more reliable handling of the pole and large fish.

Considered along particular structural lines, additional novelty is predicated upon the provision of a structural arrangement characterized by a shield carrying means for slidably connecting it with the belt, the shield constituting a rest and backing member for the adjacent slidable end of a socket, the socket being slidably associated with a pendulus hanger clamp, whereby to permit the socket to occupy a normal upwardly inclined position while the line is being paid out, and then gradually slid out through the hanger clamp while riding against the shield to occupy a downwardly tilted position, so as to permit the pole to be manipulated and maneuvered and properly angled as the fish is brought in close to the boat.

Features and advantages in addition to those specifically enumerated will become more readily apparent from the following description and the accompanying illustrative drawing.

In the drawing wherein like numerals are used to designate corresponding parts throughout the views:

Figure 1 is a perspective illustration of a pole holder constructed in accordance with the principles of the present inventive conception and showing how it is applied and used;

Figure 2 is a view essentially in section, showing, in dotted lines, the downwardly tilted position of the socket which is the approximate position occupied when the pole is tilted downwardly over the edge of the boat under certain predetermined conditions.

Figure 3 is a horizontal sectional view showing the socket in a position substantially parallel to the belt adapter and attaching means;

Figure 4 is a front elevational view of the shield-like adapter and rest means with the clamp and socket removed for clearness of illustration;

Figure 5 is a perspective view of the belt accommodation loop per se.

As before indicated, the device is used in connection with a conventional belt B. This is mentioned at the outset to distinguish the invention from those devices which are made up with a special harness to embrace the body in different ways. The fishing rod and reel assembly is indicated by the letter R, these being conventional parts.

In practice the handle portion of the rod, pole, or the device, is fitted into the cylindrical cup or socket 6. This is of appropriate dimensions and length. The inner end thereof is preferably rounded as indicated at 7 and formed with an aperture 8 to allow discharge of water which may accumulate therein. The open mouth portion of the socket is provided with an outstanding bead 9, which forms a stop element. There is a similar bead or equivalent means 10 at the inner end of the socket which also functions as a stop element.

The socket is saddled in a pendulous-like embracing ring or clamp 11. This forms a stirrup-like hanger bracket and preferably includes a pair of attaching arms 12 detachably and pivotally bolted as at 13 to an outstanding lug 14 carried by the belt loop 15. This belt loop is adapted to slip over the belt as shown in Figure 1 so that it can be adjusted to the desired and most comfortable fishing position. Referring to Figure 3, it will be observed that the pivot bolt is provided with a thumb nut 16. This provides a pivoting and clamping connection between the hanger clamp and supporting lug 14. It is possible to tighten the nut sufficiently to virtually connect the clamp to the lug 14 and to firmly grip the annular band 11 around the socket. Under ordinary circumstances, however, the nut is left sufficiently loose so that the hanger clamp is in effect a pendulous-like cradle in which the socket 6 is rotatable and longitudinally slidable. That is to say, the clamp 11 is not tightened sufficiently to prevent the desired slippage of the socket therethrough. It will be observed, however, that the beads 9 and 10 prevent accidental endwise displacement by limiting the sliding movement in the clamp 11 in opposite directions.

In practice it is understood that the butt or lower end of the socket rests against the person as indicated in the drawing. Under certain conditions there would obviously be considerable endwise thrust, to the extent that it would possibly promote discomfort. Under the circumstances, this is offset by incorporating in the structure a backing plate or shield 17 of the general configuration and form shown in the drawing. It has been found expedient and practicable to use a piece of heavy leather for the purpose. It is evident, however, that other flexible material might well serve. In any event, the belt loop 15 is stitched or otherwise fastened to the upper shank portion of the shield by a patch 18 as illustrated. Thus, we have the pendulous clamp and belt-attaching loop secured to the upper flexible shank portion of the shield which is self-adapting to accommodate successful manipulation of the pole.

In operation, one end of the belt is slipped through the loop 15 and this serves to apply the device in position ready for use. The device can be slipped around the belt to the most useful and comfortable position. The position shown in Figure 1 indicates the normal position for right-handed fishermen. For left-handed fishermen it would be shifted to the other side as is obvious. Normally, as before stated, the nut 16 is loosened sufficiently to allow arcuate swinging of the clamp to give it the desired cradle action for the relatively slidable and bodily shiftable socket 6. While the pole is held in the normal inclined fishing position shown in Figure 1, the clamp is at obtuse angles to the supporting lug 14. Also, the lower butt end of the socket rests in contact with the shield 17. As the fish is pulled in close to the boat, the pole must necessarily be lowered to an inclination below the horizontal. As it is gradually lowered, the rounded butt of the socket slides up gradually in riding or cam contact with the shield. At the same time it feeds out through the saddling clamp 11 until it gradually swings almost completely through it to occupy the downwardly inclined position illustrated in dotted lines in Figure 2. This compensating and self-adapting phase of the invention is highly important in that it prevents the socket from being punched into the side or abdomen of the user. It relieves undue pressure. Thus the parts contribute their proportionate share to the development of an easily handled and automatically adapting pole holder.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a belt attachment including a thrust reception and body shield, a pole-accommodation socket having one end in constant movable contact and thrust relation with said shield, and means for slidably and pivotally attaching the socket to said attachment.

2. In a structure of the class described, a belt loop, a cradle-like carrier clamp pivotally attached to said loop, a socket slidable in the carrier clamp, and a protector with which the inner end of the socket has slidable self-adjusting contact in the manner and for the purposes described.

3. In a structure of the class described, a pliable body protector shield, a loop carried thereby, said loop being adapted to fit over a conventional belt, a clamp pivotally attached to said loop, and a socket slidably mounted in said clamp, said socket being provided with longitudinally spaced stop elements cooperable with the clamp to avoid accidental displacement as described.

4. In a belt-type fishing rod holder of the class described, a belt loop for passage of a conventional body encircling belt, a cradle-like carrier clamp pivotally attached to said loop, an end thrust and body protecting shield adapted to bear against the body of the wearer and provided with means for attachment to said belt loop, and a fishing rod holding cup slidably mounted in said carrier clamp and having its inner end of part-spherical form to rest in freely movable constant contact with said shield.

5. As a component part of an assemblage of the class described, a belt loop attachable to a belt, a cradle-like clamping ring pivotally attached to said loop, and a rod receiving and holding cup slidably and rotatably mounted in said clamping ring, the inner end of the cup being of rounded formation and being provided with an outstanding shoulder-forming bead limiting the sliding movement through said clamping ring in an outward direction.

ALBERT S. HAISLIP.